(12) United States Patent
Maeda

(10) Patent No.: US 6,450,046 B1
(45) Date of Patent: Sep. 17, 2002

(54) PRESSURE SENSITIVE SWITCH AND SEATING DETECTOR HAVING THE SAME

(75) Inventor: Tsutomu Maeda, Shijonawate (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 162 days.

(21) Appl. No.: 09/693,142

(22) Filed: Oct. 20, 2000

(30) Foreign Application Priority Data

Oct. 22, 1999 (JP) .......................................... 11-300955

(51) Int. Cl.$^7$ ................................................ G01L 1/04
(52) U.S. Cl. ............................. 73/862.473; 73/862.451
(58) Field of Search ..................... 73/862.041, 862.042, 73/862.043, 862.044, 862.045, 862.046, 862.451, 862.473

(56) References Cited

U.S. PATENT DOCUMENTS

| | | | |
|---|---|---|---|
| 4,481,815 A | * 11/1984 | Overton | ...................... 338/114 |
| 4,492,949 A | * 1/1985 | Peterson et al. | ............. 338/114 |
| 5,079,949 A | * 1/1992 | Tamori | ......................... 338/99 |
| 5,451,724 A | * 9/1995 | Nakazawa et al. | ........ 178/18.05 |
| 5,514,843 A | 5/1996 | Wilfong et al. | |
| 5,952,585 A | * 9/1999 | Trantzas et al. | ........ 73/862.046 |
| 6,006,386 A | * 12/1999 | Mohaupt | .................. 73/862.68 |

* cited by examiner

Primary Examiner—Max Noori
(74) Attorney, Agent, or Firm—RatnerPrestia

(57) ABSTRACT

A pressure sensitive switch disposed in the seat of a vehicle and a seating detector having the pressure sensitive switch are provided. Loss in its production can be reduced for obtaining an inexpensive pressure sensitive switch. The pressure sensitive has a movable contact layer formed underneath a top sheet and a fixed contact layer formed over a bottom sheet. A mark showing the resistance characteristic of the contact layer in the pressure sensitive switch is indicated on the top surface of the top sheet.

8 Claims, 9 Drawing Sheets

PRESSURE SENSITIVE SWITCH AND SEATING DETECTOR HAVING THE SAME

FIELD OF THE INVENTION

The invention relates to a pressure sensitive switch disposed inside the seat of a vehicle for detecting whether there is a passenger on the seat or not, and a detector having the pressure sensitive switch.

BACKGROUND OF THE INVENTION

As vehicles having high-level functions increase, various pressure sensitive switches are used to control such functions as an air bag system or an indication of a seat-belt-wear sign by detecting a seated passenger and his/her weight.

A conventional pressure sensitive switch will be described with reference to FIG. 8 through FIG. 11

FIG. 8 is a cross sectional view of the conventional pressure sensitive switch. Movable contact layer 2, which is a pressure sensitive resistance element and made of resins-like epoxy resin, phenol resin, or polyester resin-with conductive powder like carbon dispersed therein, is formed by printing underneath top sheet 1 made of flexible insulating films like polyethylene terephthalate or polyimide. Bottom sheet 3 made of flexible insulating film-like polyethylene terephthalate or polyimide-is disposed under top sheet 1. Plural pairs of comb-like conductive layers 4A and 4B are formed by etching a copper foil bonded onto bottom sheet 3 or by printing flexible resin-like polyester or epoxy resin-with silver or carbon dispersed therein over bottom sheet 3. Fixed-contact layers 5A and 5B, which are pressure sensitive resistance elements and made of resin-like epoxy resin, phenol, or polyester-with carbon dispersed therein is formed by printing over conductive layers 4A and 4B such that layers 5A and 5B are opposed to layer 2 over top sheet 1.

Insulating spacer layer 6 made of resins like epoxy resin, phenol, or polyester is formed by printing over bottom sheet 3 so as to expose fixed-contact layers 5A and 5B. Adhesive layer 7 made of resins like polyester or acrylic resin is formed by printing underneath top sheet 1 so as to expose movable contact layer 2. Adhesive layer 7 bonds top sheet 1 and bottom sheet 3 together and holds a predetermined distance between movable contact layer 2 and fixed-contact layers 5A and 5B.

The pressure sensitive switch with a configuration described above is disposed inside the seat of a vehicle. When a passenger sits on the seat, top sheet 1 is dented by the weight of the passenger and movable contact layer 2 underneath top sheet 1 makes contact with fixed-contact layers 5A and 5B over bottom sheet 3. Then, as a load placed on the seat increase, a contacting area among particles of conduct powder dispersed in movable contact layer and fixed-contact layers 5A and 5B increases, a resistance in the pressure-sensitive-resistance element decreases. When the passenger is seated completely and the load placed on the seat reaches a constant value, the contacting area among particles of conductive powder provides a certain value. A resistance becomes a constant value which is not greater than a predetermined value as compared with starting to contact. The sum of resistances in each point in movable contact layer 2 and fixed contact layers 5A and 5B is detected as a resistance of the pressure sensitive switch.

A conventional seating detector having the above pressure sensitive switch will be described below.

FIG. 10 is a circuit diagram of the conventional seating detector. Pressure sensitive switch 8 with the configuration as described above is coupled to control circuit 9. One of conductive layers 4A and 4B in pressure sensitive switch 8 is coupled to a power source, and the other conductive layer is coupled to fixed resistor 10. Branch point A10 is coupled to a negative input of comparator 12 which determines a predetermined threshold voltage and controls an output through fixed resistor 11. Fixed resistors 13 and 14 for setting the threshold voltage are coupled to a positive input of comparator 12 through fixed resistor 15 from branch point B10. Fixed resistor 16 is coupled to comparator 12 as a feedback resistance, and output section 17 of comparator 12 is coupled to the power source through fixed resistor 18.

Actuation circuit 20 is coupled to output section 17 of comparator 12 and controls an operation of an air bag system or indicating a seat-belt-wear sign.

In the seating detector with the configuration described above, when the seating detector is actuated, the predetermined threshold voltage adjusted by fixed resistors 13 and 14 is fed to the positive input of comparator 12 through fixed resistor 15 from branch point B10. When a passenger is seated and the resistance of pressure sensitive switch 8 becomes low, the voltage of branch point A10 determined by pressure sensitive switch 8 and fixed resistor 10 becomes high. After the passenger seated completely, the voltage determined by pressure sensitive switch 8 and fixed resistor 10 becomes constant. The constant voltage is fed to the negative input of comparator 12 through fixed resistor 11 from branch point A10. Comparator 12 compares the threshold voltage from branch point B10 and the voltage from branch point A10. When the voltage from branch point A10 is higher than the threshold voltage from branch point B10, the resistance is not greater than a predetermined value because a load of not less than a predetermined value is placed on the pressure sensitive switch. When the seating detector determines that the passenger is seated completely and the weight of the passenger is not less than a predetermined value, control signals is output to actuation circuit 20 from output section 17.

In pressure sensitive switch 8 used as described above, movable contact layer 2 and fixed-contact layers 5A and 5B as pressure sensitive resistance elements are formed by screen printing with ink made of resin having conductive powder dispersed therein. A resistance characteristic varies according to a compounding ratio of conductive powder and resin in the ink used for printing, variation in the diameter of particle of conductive powder, thickness of a printing plate, or a drying condition in printing. As shown in the resistance characteristic chart in FIG. 11, for example, a load placed on the switch is inversely proportional to a resistance in reference characteristic (c). When the conductive powder is contained in movable contact layer 2 and fixed contact layers 5A and 5B is small, and the printed layers are thin, the whole resistance is high as shown in characteristic (d). In contrast, when much conductive powder is contained and the printed layers are thick, the whole resistance is low as shown in characteristic (e).

For testing resistance characteristics of the pressure sensitive switch, loads F1 and F2 are placed on the switch respectively on a basis of a reference resistance R0 at reference load F0. The test determines whether or not these resistance are within tolerances of R1 and R2 respectively, and then, determines the quality of the pressure sensitive switch. For the characteristic (d) with a high resistance, when load F2 is placed on the switch, the resistance is in a range of R1 to R2. However, when load F1 is placed on the switch, the resistance becomes R3, which is out of the tolerance higher than R2. Therefore, this pressure sensitive switch is out of the reference. For characteristic (e) with low resistance, when load F1 is placed on the switch, the resistance is in a range of R1 to R2. However, when load F2 is placed on the switch, the resistance becomes R4, which is out of the tolerance lower than R1. The pressure sensitive switch is therefore determined that it is out of the reference.

The pressure sensitive switch determined to be out of the reference cannot be used, therefore, a lot of loss occurs in actual production.

SUMMARY OF THE INVENTION

An inexpensive pressure sensitive switch by reducing the loss which occurs during the production of the switch and a seating detector having the pressure sensitive switch are presented. The pressure sensitive switch indicates a mark on a top or bottom sheet to show a resistance characteristic of contact layers in the switch. At least one of a wiring layer and a resistor layer, which has a different conducting condition and different resistance, is formed corresponding to each resistance characteristic. The inexpensive pressure sensitive switch whose resistance characteristic can be determined and the seating detector having the pressure sensitive switch are provided.

DESCRIPTION OF THE PREFERED EMBODIMENTS

Exemplary embodiments of the invention will be described hereinafter with reference to FIG. 1 through FIG. 7. The parts corresponding to the constituents shown in the description of the prior art are identified with the same numeral, and the detailed description for them is omitted.

Embodiment 1

Figure 1:
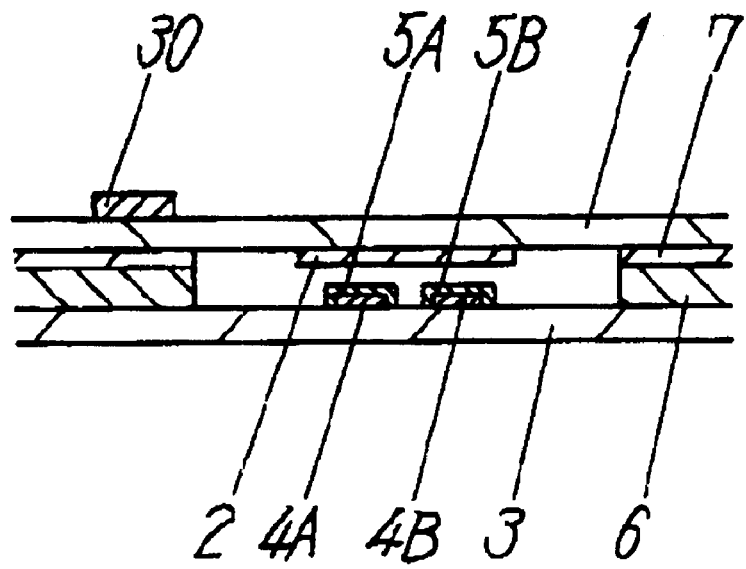
FIG. 1 illustrates a cross sectional view of a pressure sensitive switch in accordance with embodiment 1 of the invention.
Figure 2:
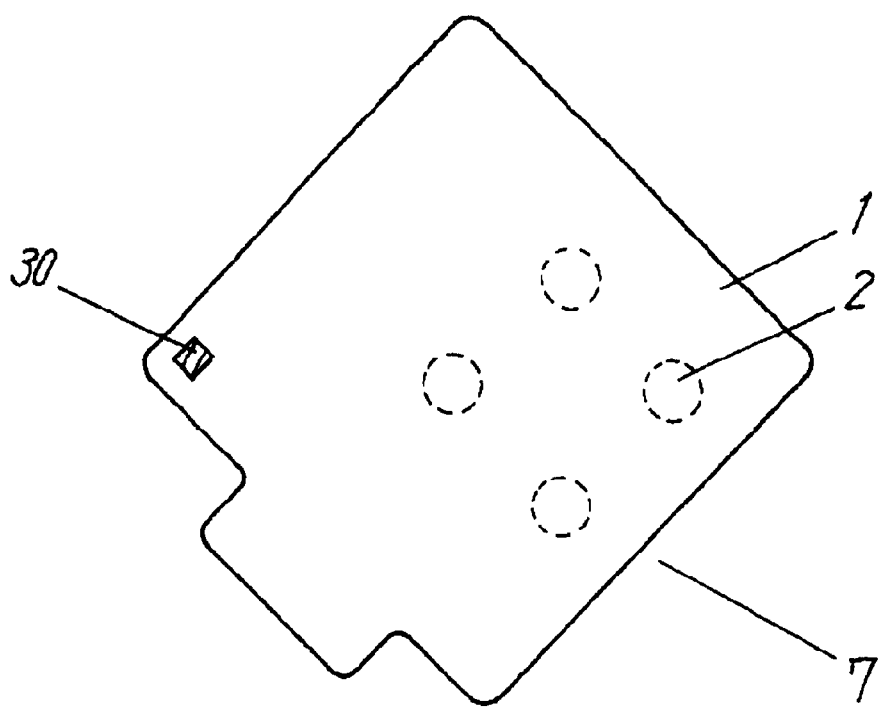
FIG. 2 illustrates an exploded perspective view of the pressure sensitive switch in accordance with embodiment 1 of the invention.
Figure 2:
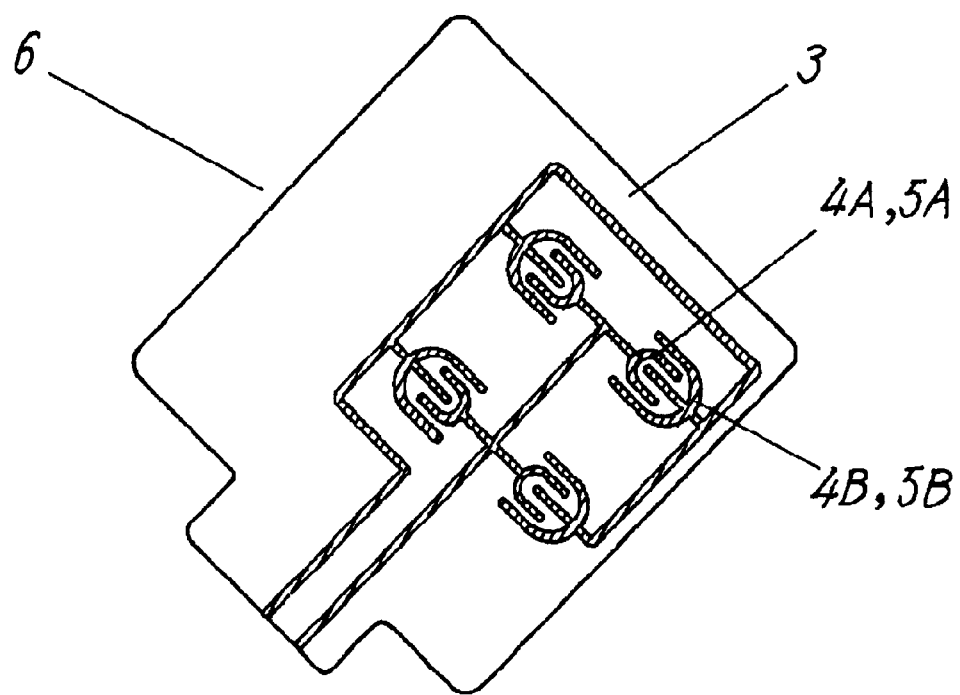

FIG. 1 illustrates a cross sectional view of a pressure sensitive switch according to embodiment 1 of the invention. FIG. 2 illustrates an exploded perspective view of the pressure sensitive switch. Top sheet 1 is made of flexible insulating film like polyethylene, terephthalate, or polyimide. Movable contact layer 2, which is a pressure sensitive resistance element and is made of resin like epoxy resin, phenol, or polyester with conductive powder like carbon dispersed therein, is formed underneath top sheet 1. Bottom sheet 3, which is made of flexible insulating film like polyethylene, terephthalate, or polyimide, is disposed under top sheet 1. Plural pairs of comb-like conductive layers 4A and 4B are formed by etching a copper foil bonded to bottom sheet 3 or by printing flexible resins like polyester or epoxy resin with silver or carbon dispersed therein over bottom sheet 3. Fixed-contact layers 5A and 5B, which are pressure sensitive resistance elements and made of resin like epoxy resin, phenol, or polyester with carbon dispersed therein, are formed by printing over conductive layers 4A and 4B so as to be opposed to movable contact layer 2 underneath top sheet 1. Insulating spacer layer 6 made of resins like epoxy resin, phenol, or polyester is formed by printing over bottom sheet 3 so as to expose fixed-contact layers 5A and 5B. Adhesive layer 7 made of resin-like polyester or acrylic resin-is formed by printing underneath top sheet 1 so as to expose movable contact layer 2. Adhesive layer 7 bonds top sheet 1 and bottom sheet 3 together and holds a predetermined distance between movable contact layer 2 and fixed-contact layers 6A and 5B opposing to each other. Mark 30 is indicated on the top surface of top sheet 1 to show the resistance characteristic of contact layers.

Insulating spacer layer 6 can be formed by bonding tape to top sheet 1, instead of printing.

The pressure sensitive switch with the configuration described above is disposed in the seat of a vehicle. When a passenger is seated, top sheet 1 is dented by the weight of the passenger, and movable contact layer 2 underneath top sheet 1 makes contact with fixed-contact layers 5A and 5B. A contacting area among the particles of conductive powder dispersed in movable contact layer 2 and fixed-contact layers 5A and 5B increases, and resistance of the contact layers as the pressure sensitive resistance layers is reduced as the load increases.

Figure 11:
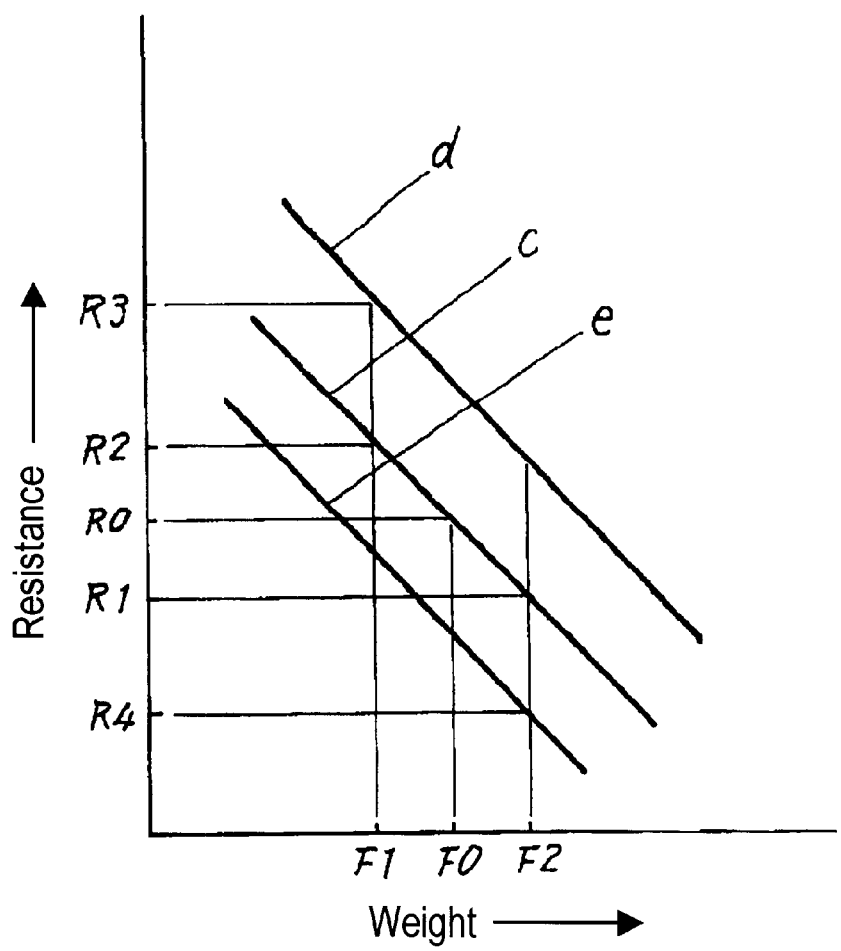
FIG. 11 is a resistance characteristic chart of the pressure sensitive switch.

Then, as shown in the resistance characteristic chart in FIG. 11, A resistance characteristic varies like characteristic (d) having a higher resistance and characteristic (e) having a lower resistance compared to reference characteristic (c). Mark 30 using alphanumeric characters is recorded to show the resistance characteristic for each pressure sensitive switch so that it can be determined which resistance characteristic (c), (d), or (e) each pressure switch has.

Figure 3:
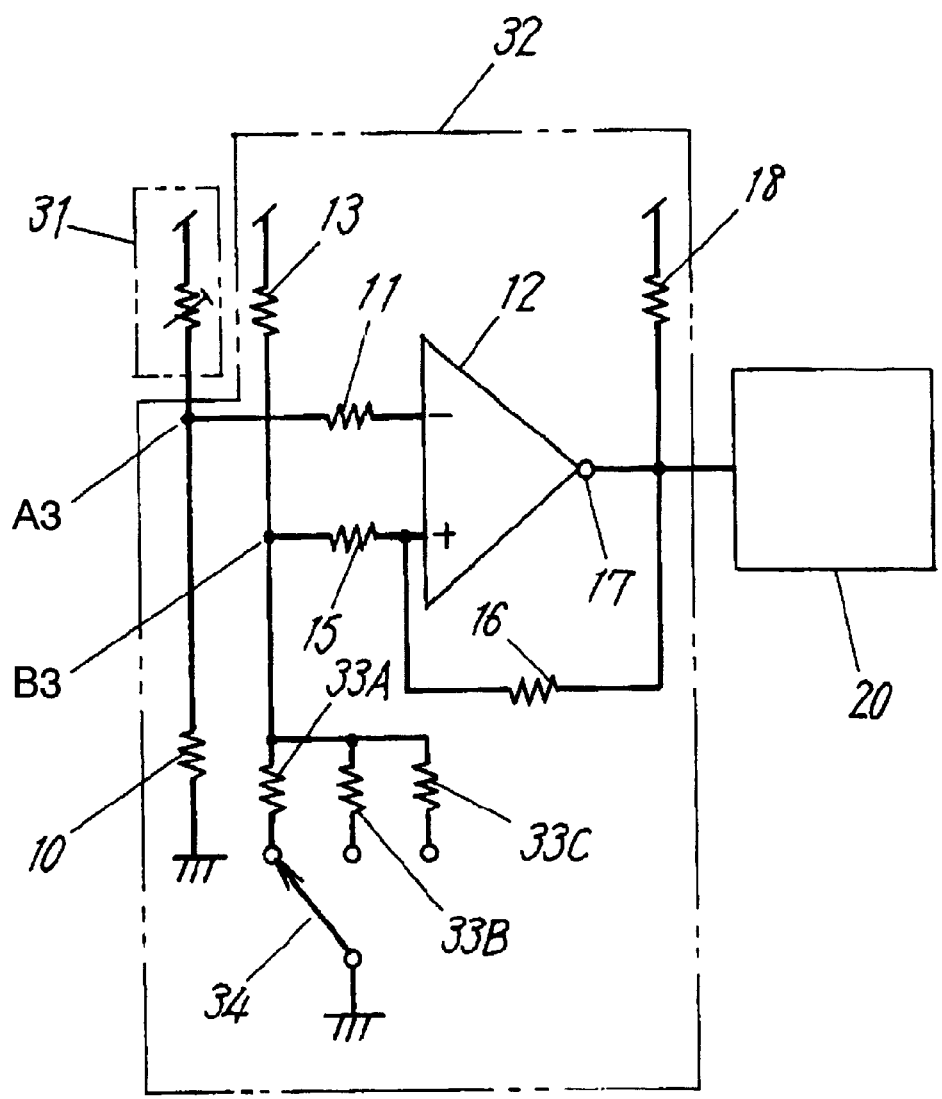
FIG. 3 is a circuit diagram of a seating detector having the pressure sensitive switch in accordance with embodiment 1 of the invention.

A seating detector having the pressure sensitive switch is described below. FIG. 3 is a circuit diagram of the seating detector. Pressure sensitive switch 31 having the configuration described above is coupled to control circuit 32. One of conductive layers 4A and 4B is coupled to a power source, and the other conductive layer is coupled to fixed resistor 10. Branch point A3 is coupled to a negative input of comparator 12 through fixed resistor 11. Comparator 12 judges based on a predetermined threshold voltage and controls an output. Fixed resistor 16 is couple to comparator 12 as a feedback resistor. Output section 17 of comparator 12 is couple to the power source through fixed resistor 18. Actuation circuit 20, which controls an operation of an air bag system and indicating a seat-belt-wear sign, is coupled to output section 17 as in the prior art. Fixed resistors 33A, 33B, and 33C, which have different resistances respectively, are coupled to fixed resistor 13 for setting threshold voltages and coupled to the positive input of comparator 12 through fixed resistor 15 from branch point B3. Selecting switch 34 is coupled to resistors 33A, 33B, and 33C to select one from the resistors. When pressure sensitive switch 31 is coupled to control circuit 32, pressure sensitive switch 31 is coupled to one of fixed resistor 33A, 33B and 33C by selecting switch 34 according to mark 30 showing difference from a reference in resistance characteristics. As a result, a threshold voltage of control circuit 32 set by fixed resistor 13 and a fixed resistor selected from fixed resistors 33A, 33B, and 33C is corrected responsive to the resistance characteristic of pressure sensitive switch 31.

When the seating detector is in the operation, the predetermined threshold voltage set by fixed resistor 13 and one of fixed resistors 33A, 33B, and 33C is fed into the positive input of comparator 12 through fixed resistor 15 from branch point B3. When a passenger is seated completely, the resistance of pressure sensitive switch 31 becomes constant. The voltage set by fixed resistor 10 and the constant resistance is fed into the negative input of comparator 12.

Comparator 12 compares the threshold voltage from branch point B3 and the voltage from branch point A3. As described above, when fixed resistor 13 is coupled to one of fixed resistor 33A, 33B, and 33C previously selected by selecting switch 34 according to mark 30 showing the resistance characteristic, the threshold voltage is corrected according to the resistance characteristic of pressure sensitive switch 31. Even if the resistance characteristic of pressure sensitive switch 31 is apart from the reference characteristic, the pressure sensitive switch can accordingly determine the weight of the passenger accurately. After determining, when a control signal is output to actuation circuit 20 from output section 17 of comparator 12, circuit 20 actuates an air bag system and the seat-belt-wear sign for passengers.

According to the embodiment, loss in production can be reduced, and an inexpensive pressure sensitive switch and a seating detector having the pressure sensitive switch can be provided.

Furthermore, in the above description, the seating detector, which corrects a threshold voltage responsive to the resistance characteristic of the pressure sensitive switch by selecting one of fixed resistors 33A, 33B, and 33C disposed in control circuit 32, is described. The resistance characteristic of the pressure sensitive switch is indicated by mark 30. The resistance characteristic of the pressure sensitive switch itself can be therefore corrected to a reference characteristic by coupling fixed resistors, corresponding to each resistance characteristic of the pressure sensitive switch, in series or in parallel when the pressure sensitive switch is disposed in the seating detector, or by placing a similar function in the circuit of the switch.

Embodiment 2

Figure 4:
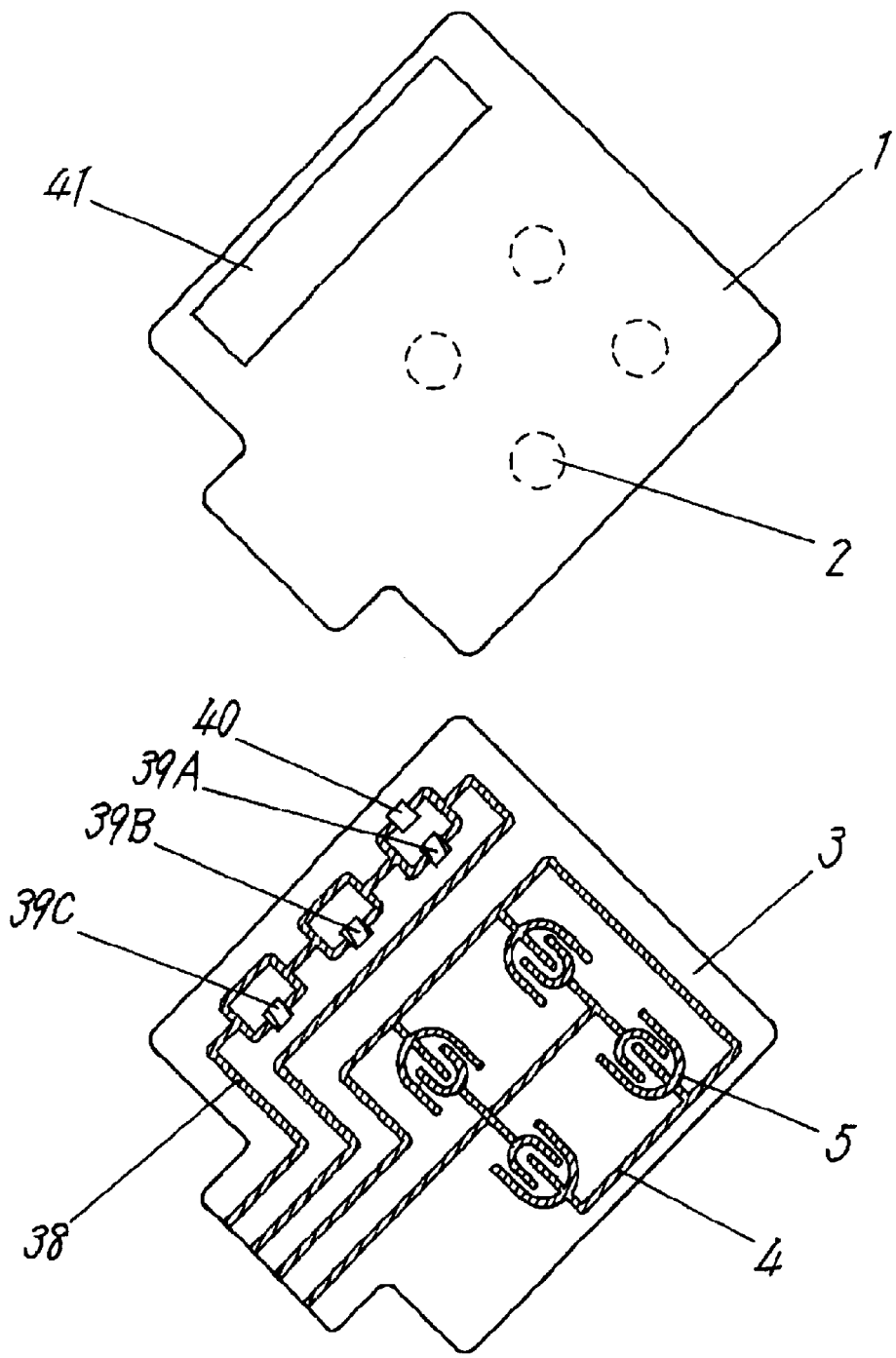
FIG. 4 illustrates an exploded perspective view of the pressure sensitive switch in accordance with embodiment 2 of the invention.

FIG. 4 illustrates an exploded perspective view of a pressure sensitive switch. Movable contact layer 2, which is a pressure sensitive resistance element, is formed by printing underneath top sheet 1 made of flexible insulating film. Bottom sheet 3 made of flexible insulating film is disposed under top sheet 1. Conductive layer 4 is formed by printing over bottom sheet 3, also fixed contact layer 5, which is a pressure sensitive resistance element, is formed by printing over conductive layer 4. Insulating spacer layer 6 (not shown) is formed by printing over bottom sheet 3. Adhesive layer 7 (not shown) formed by printing underneath top sheet 1 bonds top sheet 1 and bottom sheet 3 together and holds a predetermined distance between movable contact layer 2 and fixed contact layer 5 opposing to each other as in embodiment 1.

In the pressure sensitive switch, wiring layer 38 is formed by etching a copper foil bonded to bottom sheet 3 or by printing flexible resin-like polyester or epoxy resin-with silver or carbon dispersed therein. Wiring layer 38 is coupled to a plurality of resistor layers 39A, 39B, and 39C which are made of resin-like epoxy resin, phenol, or polyester-with carbon dispersed therein. Cut-hole 40 formed by press-working is disposed on resistor layer 39A and wiring layer 38 wired in parallel with layer 39A. Opening-hole 41 is disposed on top sheet 1 so as to oppose wiring layer 38 and resistance layer 39A, 39B, and 39C.

Wiring layer 38 and resistance layers 39A, 39B, and 39C are disposed to determine the resistance characteristic of the pressure sensitive switch. According to test result for the resistance characteristic of the pressure sensitive switch, for example, (i) in the pressure sensitive switch having a reference resistance characteristic, cutting hole 40 is not formed;

(ii) in the pressure sensitive switch having a higher resistance characteristic, cutting hole 40 is formed in wiring layer 38 wired in parallel with resistance layer 39A; or (iii) in the pressure sensitive switch having a lower resistance characteristics, two cutting holes 40 are disposed in wiring layer 38 in parallel with resistance layers 39A and 39B respectively.

A resistance between ends of wiring layer 38 is measured as one almost only by wiring layer 38 itself in the pressure sensitive switch having the reference resistance characteristic. In the pressure sensitive switch having a higher resistance characteristic, a resistance in wiring layer 38 becomes the sum of a resistance in wiring layer 38 and that in resistance layer 39A. In the pressure sensitive switch having a lower resistance characteristic, a resistance in wiring layer 38 becomes the sum of each resistance in wiring layer 38 and in resistance layer 39A and 39B. The resistance characteristic of the pressure sensitive switch is accordingly discriminated.

The pressure sensitive switch is disposed in the seat of a vehicle. When a passenger is seated, top sheet 1 is dented by the weight of the passenger, and movable contact layer 2 underneath top sheet 1 makes contact with fixed-contact layer 5 over bottom sheet 3. Then, the resistance in the pressure sensitive switch is detected from conductive layer 4 as in the prior art and embodiment 1.

A seating detector having the pressure sensitive switch will be described below.

Figure 5:
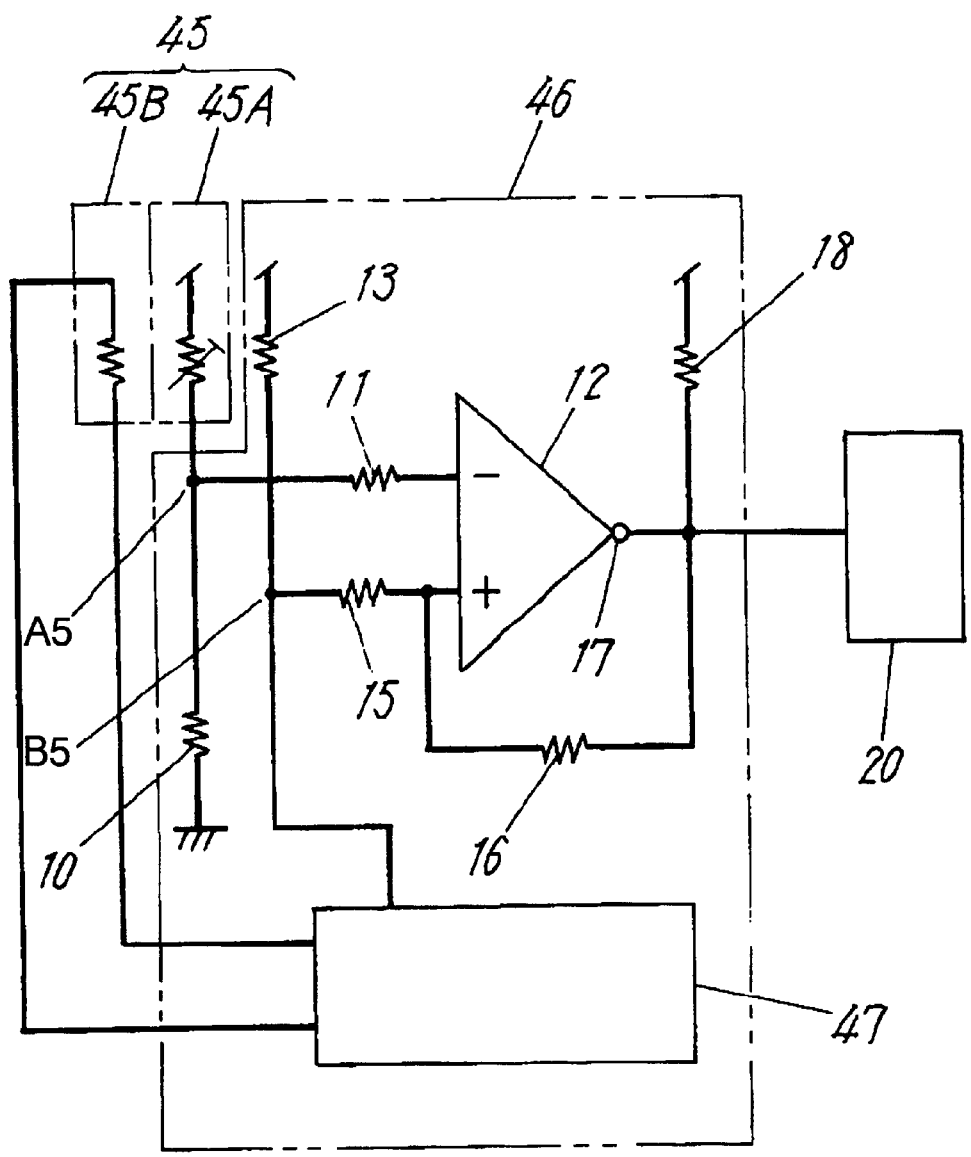
FIG. 5 is a circuit diagram of a seating detector having the pressure sensitive switch in accordance with embodiment 2 of the invention.

FIG. 5 is a circuit diagram of a seating detector. Pressure sensitive switch 45 is coupled to control circuit 46. Switch contact part 45A having movable contact layer 2 and fixed-contact layer 5 of pressure sensitive switch 45 is coupled to an negative input of comparator 12 through fixed resistor 11 from branch point A5. Actuation circuit 20, which controls an operation of an air bag system and indicating a seat-belt-wear sign, is coupled to output section 17 of comparator 12 as in the prior art and embodiment 1. In the circuit, fixed resistor 13 for setting a threshold voltage is coupled to microcomputer 47 and further is coupled to the positive input of comparator 12 through fixed resistor 15 from branch point B5. Microcomputer 47 is coupled to wiring layer 38 of pressure sensitive switch 45 and resistance part 45B having resistance layers 39a, 39B and 39C.

When the seating detector is in an operation, microcomputer 47 detects the resistance in resistance part 45B of pressure sensitive switch 45, and for example, discriminates which resistance characteristic the pressure sensitive switch has, a reference resistance characteristic, a high resistance characteristic, or a low resistance characteristic. And then, microcomputer 47 corrects fixed resistor 13 and a threshold voltage responsive to the resistance characteristic of pressure sensitive switch 45. After that, the corrected threshold voltage is output to the positive input of comparator 12 through fixed resistor 15 from branch point B5. When a passenger is seated completely, the resistance in switch contact part 45A of pressure sensitive switch 45 becomes constant. The voltage set by the resistance and fixed resistor 10 is fed to the negative input of comparator 12 through fixed resistor 11 from branch point A5. Comparator 12 compares the threshold voltage from branch point B5 and the voltage from branch point 5A.

At this time, as described above, microcomputer 47 detects and corrects the threshold voltage responsive to the resistance characteristic of pressure sensitive switch 45. The seating detector having the pressure sensitive switch determines the weight of the passenger accurately even when the resistance characteristic of pressure sensitive switch 31 is apart from the reference.

Then, when a control signal is output to actuation circuit 20 from output section 17 of comparator 12, actuation circuit 20 actuates an air bag system or a seat-belt-wear sign for passengers as in embodiment 1.

According to the embodiment, the pressure sensitive switch automatically correcting a resistance characteristic and the seating detector which has a simple structure and can be assembled readily are provided. Furthermore, as opening-hole 41 is formed where opening-hole 31, opposing wiring layer 38, resistance layers 39A, 39B, and 39C, when cutting hole 40 is formed by cutting wiring layer 38, cutting burrs is hardly produced, and the hole is formed with ease as compared with cut of double-ply sheets.

Figure 6:
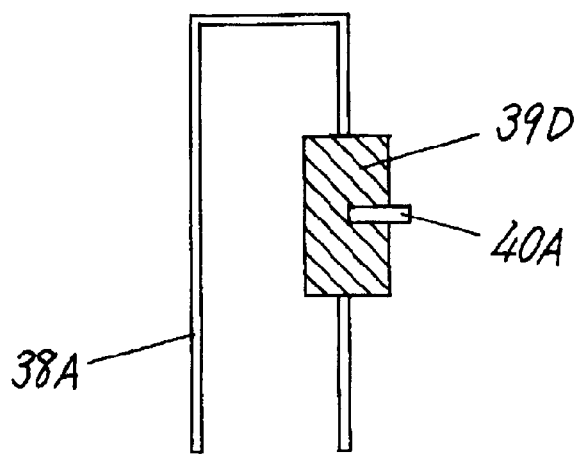
FIG. 6 illustrates a plan view of the prime part of the pressure sensitive switch in embodiment 2 of the invention.
Figure 7:
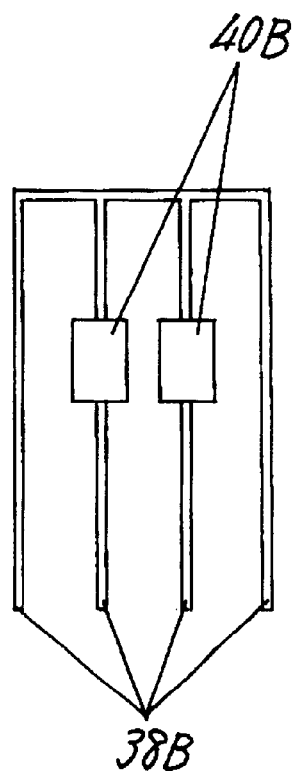
FIG. 7 illustrates a plan view of the prime part of the pressure sensitive switch in accordance with embodiment 2 of the invention.
Figure 8:
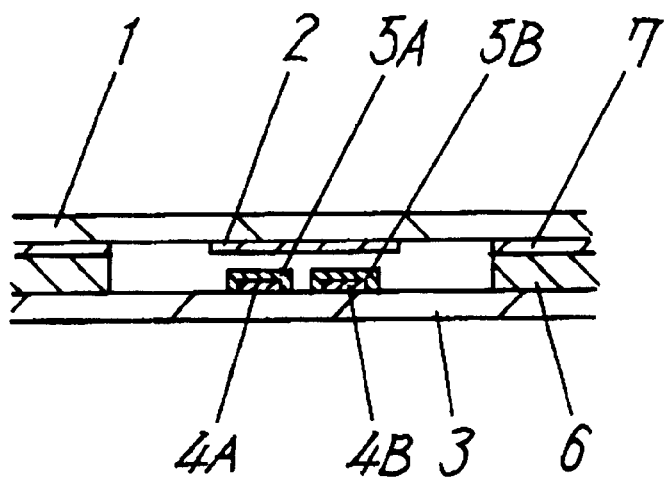
FIG. 8 illustrates a cross sectional view of a conventional pressure sensitive switch.
Figure 9:
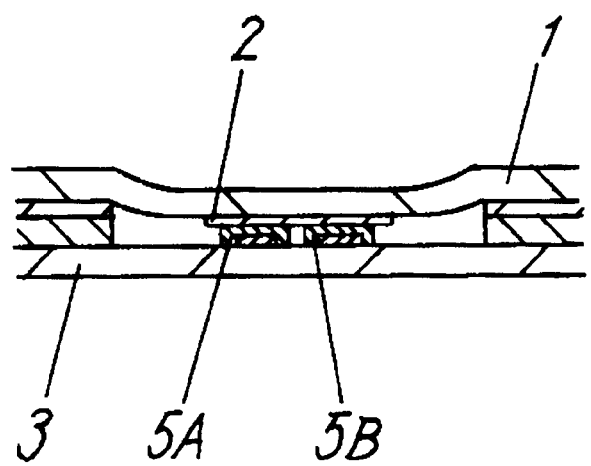
FIG. 9 illustrates a cross sectional view of the pressure sensitive switch in operation.
Figure 10:
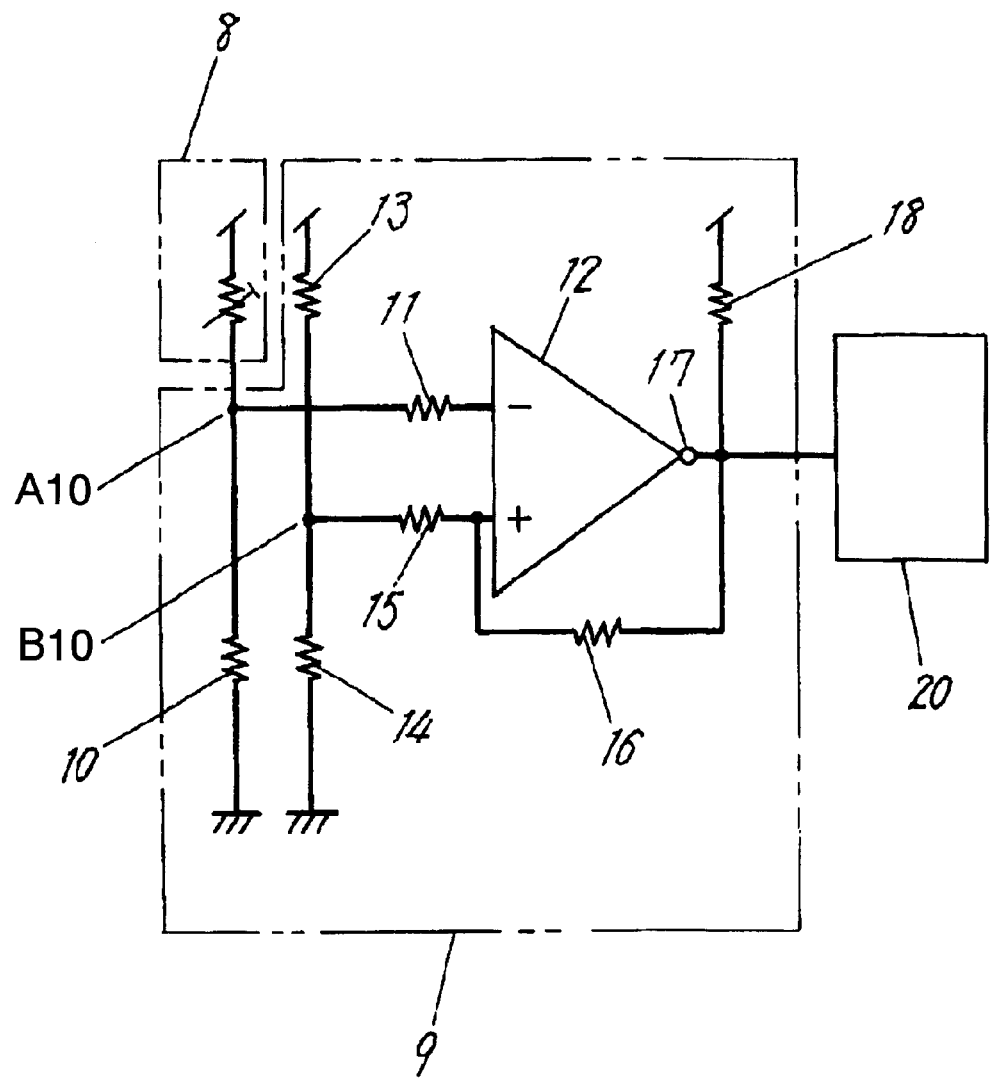
FIG. 10 is a circuit diagram of a seating detector having the conventional pressure sensitive switch.

In the above explanation, wiring layer 38 and a plurality of resistance layers 39A, 39B and 39C are formed over bottom sheet 3, and the resistance characteristic of each pressure sensitive switch is determined based on the resistance. Instead of the resistance layers, large resistance layer 39D is formed in wiring layer 38A, and cutting hole 40 with different sizes corresponding to the resistance of the pressure sensitive switch is formed. The same effect will be obtained as in the invention as shown in FIG. 6. Furthermore, when a plurality of wiring layers 38B connected to each other are formed, and some of wiring layers is cut by cutting hole 40B, the resistance characteristic of the pressure sensitive switch is discriminated based on the conducting condition of wiring layer 38B. And the same effect is also obtained as in the invention.

Instead of wiring layers and resistance layers, a single variable resistor and a selecting switch are disposed in the pressure sensitive switch, and the resistor and the switch are adjusted according to the resistance characteristic when testing. The resistance characteristic of the pressure sensitive switch is discriminated base on the resistance and the conducting conduction.

Furthermore, when the microcomputer incorporates such a function as comparator 12 and determines a resistance in pressure sensitive switch 45 simultaneously and then controls actuation circuit 20, the configuration of the seating detector can be simplified and assembled readily.

What is claimed is:

1. A pressure sensitive switch comprising:
a top sheet made of flexible insulating film;
a movable contact layer made of resin with conductive powder dispersed therein underneath said top sheet;
a bottom sheet made of flexible insulating film under said top sheet;
a fixed-contact layer made of resin with conductive powder dispersed therein over said bottom sheet;
an insulating spacer layer formed between said top sheet and said bottom sheet; and
a mark over at least one of said top sheet and said bottom sheet, said mark showing a contact resistance characteristic between said movable contact layer and said fixed contact layer.

2. A pressure sensitive switch comprising:
a top sheet made of flexible insulating film;
a movable contact layer made of resin with conductive powder dispersed therein underneath said top sheet;
a bottom sheet made of flexible insulating film under said top sheet;
a fixed-contact layer made of resin with conductive powder dispersed therein over said bottom sheet;
an insulating spacer layer formed between said top sheet and said bottom sheet; and
a wiring layer over one of said top sheet and said bottom sheet, said wiring layer being changed in a conducting condition corresponding to a contact resistance characteristics between said movable contact layer and said fixed contact layer.

3. The pressure sensitive switch as defined in claim 2, wherein an opening-hole is formed at a position on other of the one of said top sheet and said bottom sheet, the position opposing said wiring layer.

4. The pressure sensitive switch comprising:
a top sheet made of flexible insulating film;
a movable contact layer made of resin with conductive powder dispersed therein underneath said top sheet;
a bottom sheet made of flexible insulating film under said top sheet;
a fixed-contact layer made of resin with conductive powder dispersed therein over said bottom sheet;
an insulating spacer layer formed between said top sheet and said bottom sheet; and
a resistance layer over one of said top sheet and said bottom sheet, said resistance layer being changed in a resistance corresponding to a contact resistance characteristic between said movable contact layer and said fixed contact layer.

5. The pressure sensitive switch as defined in claim 4, wherein an opening-hole is formed at a position on other of the one of said top sheet and said bottom sheet, the position opposing said resistance layer.

6. A seating detector comprising:
a pressure sensitive switch including:
a top sheet made of flexible insulating film;
a movable contact layer made of resin with conductive powder dispersed therein underneath said top sheet;
a bottom sheet made of flexible insulating film disposed under said top sheet;
a fixed contact layer made of resin with conductive powder dispersed therein over said bottom sheet;
an insulating spacer layer disposed between said top sheet and said bottom sheet; and
a mark over at least one of said top sheet and said bottom sheet, said mark showing a contact resistance characteristic between said movable contact layer and said fixed contact layer; and
a control circuit coupled to said pressure sensitive switch, wherein a predetermined threshold voltage in said control circuit is corrected corresponding to the contact resistance characteristic by selecting one of a plurality of resistors disposed in said control circuit.

7. A seating detector comprising:
   a pressure sensitive switch including:
      a top sheet made of flexible insulating film;
      a movable contact layer made of resin with conductive powder dispersed therein underneath said top sheet;
      a bottom sheet made of flexible insulating film disposed under said top sheet;
      a fixed contact layer made of resin with conductive powder dispersed therein over said bottom sheet;
      an insulating spacer layer disposed between said top sheet and said bottom sheet; and
      a wiring layer over one of said top sheet and said bottom sheet, said wiring layer being changed in a conducting condition corresponding to a contact resistance characteristic between said movable contact layer and said fixed contact layer; and
   a control circuit coupled to said pressure sensitive switch and detecting the contact resistance characteristic with the conducting condition,
wherein a threshold voltage in said control circuit is corrected corresponding to the contact resistance characteristic.

8. A seating detector comprising:
   a pressure sensitive switch including:
      a top sheet made of flexible insulating film;
      a movable contact layer made of resin with conductive powder dispersed therein underneath said top sheet;
      a bottom sheet made of flexible insulating film disposed under said top sheet;
      a fixed contact layer made of resin with conductive powder dispersed therein over said bottom sheet;
      an insulating spacer layer disposed between said top sheet and said bottom sheet; and
      a resistance layer over one of said top sheet and said bottom sheet, said resistance layer being changed in a resistance corresponding to a contact resistance characteristic between said movable contact layer and said fixed contact layer; and
   a control circuit coupled to said pressure sensitive switch, determining the contact resistance characteristic from the resistance,
wherein a threshold voltage in said control circuit is corrected corresponding to the contact resistance characteristic.

* * * * *